United States Patent
Ma

(10) Patent No.: US 9,666,122 B2
(45) Date of Patent: May 30, 2017

(54) METHOD FOR DRIVING AMOLED-BASED TOUCH DISPLAY PANEL

(71) Applicant: Boe Technology Group Co., Ltd., Beijing (CN)

(72) Inventor: Zhanjie Ma, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 55 days.

(21) Appl. No.: 14/418,137

(22) PCT Filed: May 21, 2014

(86) PCT No.: PCT/CN2014/078025
§ 371 (c)(1),
(2) Date: Jan. 29, 2015

(87) PCT Pub. No.: WO2015/096364
PCT Pub. Date: Jul. 2, 2015

(65) Prior Publication Data
US 2015/0332627 A1 Nov. 19, 2015

(30) Foreign Application Priority Data
Dec. 23, 2013 (CN) .......................... 2013 1 0718075

(51) Int. Cl.
*G06F 3/041* (2006.01)
*G09G 3/3225* (2016.01)
(Continued)

(52) U.S. Cl.
CPC ........... *G09G 3/3225* (2013.01); *G06F 3/041* (2013.01); *G06F 3/044* (2013.01); *G06F 3/0412* (2013.01);
(Continued)

(58) Field of Classification Search
CPC .............. G09G 2310/08; G09G 3/3648; G09G 2330/021; G09G 3/20
See application file for complete search history.

(56) References Cited

U.S. PATENT DOCUMENTS

2006/0086896 A1 4/2006 Han
2008/0309633 A1* 12/2008 Hotelling .............. G06F 3/0412
345/173
(Continued)

FOREIGN PATENT DOCUMENTS

CN 101819484 A 9/2010
CN 201611416 U 10/2010
(Continued)

OTHER PUBLICATIONS

First Chinese Office Action for Chinese Patent Application No. 201310718075.9, dated Apr. 3, 2015, 10 pages.
(Continued)

*Primary Examiner* — Olga Merkoulova
(74) *Attorney, Agent, or Firm* — Westman, Champlin & Koehler, P.A.

(57) ABSTRACT

A method for driving an AMOLED-based touch display panel, comprising: when driving the AMOLED to display, dividing one cycle of driving sequence into a display stage and a touch-sense stage; in the display stage, applying a direct-current signal applied to all of power source signal lines; and in the touch-sense stage, classifying all of the power source signal lines into a first group of power source signal lines and a second group of power source signal lines, the first group of power source signal lines and the second group of power source signal lines being disposed on a substrate of the AMOLED-based touch display panel to be perpendicular to each other; and during the period of touch-sense, applying a pulse signal to the first group of power source signal lines, and determining the position of a touch point by detecting a variation of a signal on the second group of power source signal lines. The driving sequence is divided into the display stage and the touch-sense stage, and the touch sensing and positioning of touch point is accomplished by VDD signal lines, such that no any change is
(Continued)

made to any process or profile of the pixel structure in the touch-sense stage, reducing the thickness and manufacturing cost of the display device.

4 Claims, 3 Drawing Sheets

(51) Int. Cl.
*G06F 3/044* (2006.01)
*G09G 3/3233* (2016.01)

(52) U.S. Cl.
CPC ... *G09G 3/3233* (2013.01); *G09G 2300/0819* (2013.01); *G09G 2300/0861* (2013.01); *G09G 2310/0218* (2013.01); *G09G 2310/08* (2013.01)

(56) References Cited

U.S. PATENT DOCUMENTS

| | | | |
|---|---|---|---|
| 2009/0225047 A1 | 9/2009 | Lee et al. | |
| 2012/0218482 A1* | 8/2012 | Hwang | G06F 3/044 349/12 |
| 2012/0242597 A1* | 9/2012 | Hwang | G06F 3/0412 345/173 |
| 2013/0249817 A1 | 9/2013 | Jung et al. | |
| 2013/0335366 A1* | 12/2013 | Lee | G06F 3/044 345/174 |

FOREIGN PATENT DOCUMENTS

| | | |
|---|---|---|
| CN | 102541349 A | 7/2012 |
| CN | 102693703 A | 9/2012 |
| CN | 102736811 A | 10/2012 |
| CN | 103236240 A | 8/2013 |
| CN | 103680410 A | 3/2014 |
| KR | 10-2011-0073894 A | 6/2011 |

OTHER PUBLICATIONS

Second Office Action for Chinese Patent Application No. 201310718075.9, dated Aug. 3, 2015, 11 pages.

Written Opinion, including the English translation of Box No. V, of the International Searching Authority for International Application No. PCT/CN2014/078025, dated Sep. 29, 2014, 8 pages.

Search Report and Written Opinion from PCT/CN2014/078025, dated Sep. 23, 2014.

* cited by examiner

METHOD FOR DRIVING AMOLED-BASED TOUCH DISPLAY PANEL

CROSS-REFERENCE TO RELATED APPLICATION

This Application is a Section 371 National Stage Application of International Application No. PCT/CN2014/078025, filed May 21, 2014 which has not yet published, which claims priority to Chinese Application No. 201310718075.9, filed Dec. 23, 2013, in Chinese, the contents of which are hereby incorporated by reference in their entirety.

BACKGROUND OF THE INVENTION

Field of the Invention

Embodiments of the present invention relate to display technical field, and more particularly, relates to a method for driving an AMOLED-based touch display panel.

Description of the Related Art

Currently, touch display technology has been developed speedily. Furthermore, in order to improve product reliability, reduce cost, achieve a much better light transmittance, thin the thickness of the overall screen, decrease the weight of the overall screen, and the like, the touch screen technology has been gradually changed from add on type into embedded type. With regard to an embedded type touch screen, the touch screen has been manufactured during the production of a display panel so as to optimize the function, the effect as well the cost thereof.

Currently, in cell touch technology has been employed in the pixel structure of the LCD product. The technical solution based on the in cell touch of an AMOLED (Active Matrix Organic Light Emitting Diode) panel has been mainly used in an Organic Light Emitting Diode of bottom-emission type, in which a projection capacitor structure is formed on a TFT (Thin Film Transistor) back panel. That's to say, a layer of touch structure is provided on an AMOLED structure, whereby the thickness and cost of the display device have been increased.

SUMMARY OF THE INVENTION

Embodiments of the present invention provide a method for driving an AMOLED-based touch display panel, wherein, a driving sequence is divided into a display stage and a touch-sense stage, and touch sensing and positioning of a touch point is accomplished by VDD signal lines in the touch-sense stage so as to reduce the thickness and manufacturing cost of the display device.

According to one aspect of the present invention, there is provided a method for driving an AMOLED-based touch display panel, comprising:
  when driving the AMOLED-based touch display panel to display, dividing one cycle of driving sequence into a display stage and a touch-sense stage;
  in the display stage, applying a direct-current signal to all of power source signal lines; and
  in the touch-sense stage, classifying all of the power source signal lines into a first group of power source signal lines and a second group of power source signal lines, the first group of power source signal lines and the second group of power source signal lines being disposed on a substrate of the AMOLED-based touch display panel to perpendicular to each other; and
  during the period of touch-sense, applying a pulse signal to the first group of power source signal lines, and determining the position of a touch point by detecting a variation of a signal on the second group of power source signal lines.

In the above method for driving an AMOLED-based touch display panel, the one cycle of driving sequence comprises one frame divided into the display stage and the touch-sense stage.

In the above method for driving an AMOLED-based touch display panel, the duration of the display stage is set longer than the duration of the touch-sense stage.

In the above method for driving an AMOLED-based touch display panel, the one cycle of driving sequence comprises N frames, a N-th frame thereof is divided into a first time period and a second time period, preceding N−1 frames and the first time period of the N-th frame are defined as the display stage, and the second time period of the N-th frame are defined as the touch-sense stage, wherein, N is an integer not less than 2.

In the above method for driving an AMOLED-based touch display panel, the duration of the first time period is set longer than the duration of the second time period.

In the above method for driving an AMOLED-based touch display panel, the first group of power source signal lines and the second group of power source signal lines of two adjacent groups have the same number of signal lines.

In the method for driving an AMOLED-based touch display panel according to the above embodiments of the present invention, the driving sequence is divided into the display stage and the touch-sense stage, and the touch sensing and positioning of touch point is accomplished by the VDD signal lines in the touch-sense stage, such that no any change is made to the pixel structure of AMOLED-based touch display panel, reducing the thickness and manufacturing cost of the display device.

DETAILED DESCRIPTION OF PREFERRED EMBODIMENTS OF THE INVENTION

Figure 1:
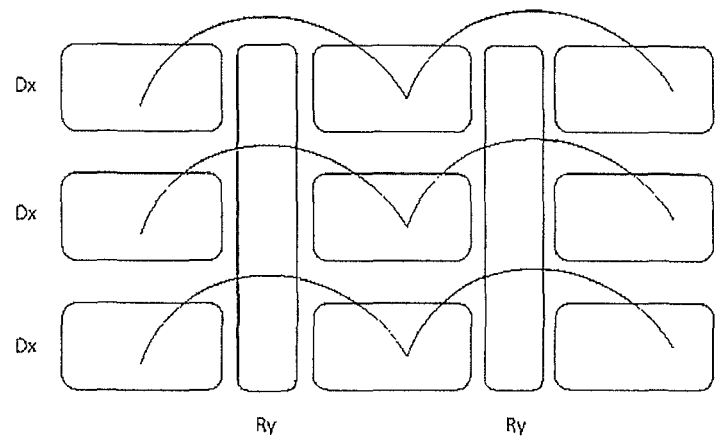
FIG. 1 is a schematic view of the plane structure of a touch panel adapted to a method for driving an AMOLED-based touch display panel according to an embodiment of the present invention.

Exemplary embodiments of the present disclosure will be further described hereinafter in detail with reference to the attached drawings and embodiments. Obviously, the described embodiments are merely used to illustrate the present invention and are not intended to limit the scope of the present invention.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 4:
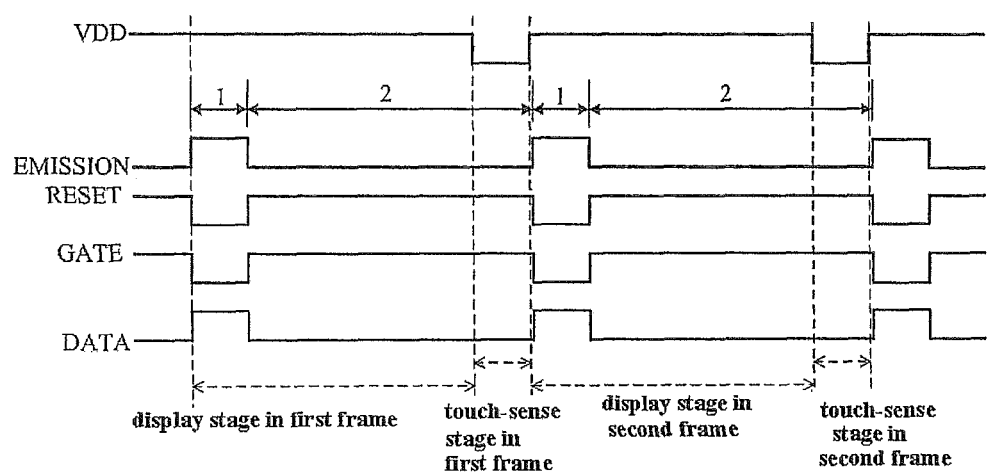
FIG. 4 is time sequence chart of the method for driving an AMOLED-based touch display panel according to the embodiment of the present invention.

Generally, an AMOLED display device compensates an IR Drop by using the provided power source signal lines VDD (Voltage Drain Drain), and the principles thereof are described as follows:

As shown in FIG. 2 and FIG. 4, operation of the equivalent circuit of the pixel structure adapted to the driving method for the AMOLED-based touch display according to the embodiment of the present invention includes: a signal loading stage 1 and a light-emitting stage 2.

In the signal loading stage 1, when an image frame data signal source $V_{DATA}$ starts to output the current frame data signal, an emission signal source $V_{EMISSION}$ is turned from a state of outputting a low voltage ON signal into a state of outputting a high voltage OFF signal, so that a switching transistor T2, a switching transistor T3 and a switching transistor T7 are turned off; a reset signal source $V_{RESET}$ is turned from a state of outputting a high voltage OFF signal into a state of outputting a low voltage ON signal, so that a reset transistor T4 is controlled to switch from an OFF state into an ON state so as to reset a voltage of an end, connected to a source of the reset transistor T4, of a storage capacitor C1 to GND; and a gate signal source $V_{GATE}$ is turned from a state of outputting a high voltage OFF signal into a state of outputting a low voltage ON signal, so that an switching transistor T5 and an switching transistor T6 are turned from an OFF state into an ON state, wherein, in the ON state of the switching transistor T6, a p-type transistor T1 is connected as a diode, and in the ON state of the switching transistor T5, the current frame data signal output by the image frame data signal source $V_{DATA}$ is transmitted to an end, connected to a gate of the p-type driving transistor T1, of the storage capacitor C1, that's to say, the voltage at the end of the storage capacitor C1 is $V_{DATA}+V_{th1}$.

In the light-emitting stage 2, the reset signal source $V_{RESET}$ and the gate signal source $V_{GATE}$ are both turned from the state of outputting low voltage ON signal into the state of outputting high voltage OFF signal, the emission signal source $V_{EMISSION}$ is turned from the state of outputting high voltage OFF signal into the state of outputting low voltage ON signal, whereby controlling the switching transistor T2, the switching transistor T3 and the switching transistor T7 to turn from OFF state into ON state; the switching transistor T7 in the ON state may allow a voltage $V_1$ of a signal output from the power source signal line VDD to be transmitted to a end, connected to the drain of the switching transistor T7, of the storage capacitor C1, that's to say, the voltage of said end of the storage capacitor C1 is switched from GND, which is formed when the emission signal source $V_{EMISSION}$ outputs a high voltage OFF signal, into $V_1$, such that the gate voltage of the p-type driving transistor T1 is switched from $V_{DATA}+V_{th1}$, which is formed when the emission signal source $V_{EMISSION}$ outputs a high voltage OFF signal, into $V_{DATA}+V_{th1}+V_1$; and the switching transistor T2 in the ON state may allow the voltage $V_1$ of the signal output from the power source signal line to be transmitted to a source of the p-type driving transistor T1; and the switching transistor T3 in the ON state may allow a drain current, which is produced by combination of the gate voltage $V_{DATA}+V_{th1}+V_1$ and the source voltage $V_1$ of the p-type driving transistor T1, to be transmitted to the anode of an OLED D1 and drive the OLED D1 to emit light together with VSS.

In this pixel circuit, since when the image frame data signal source $V_{DATA}$ stops outputting the current frame data signal, the amplitude of the storage voltage of the storage capacitor C1 is equal to the voltage signal of $V_{DATA}+V_{th1}+V_1$, and the storage capacitor C1 is connected to the gate of the p-type driving transistor T1, the gate voltage of the p-type transistor T1 is also equal to $V_{DATA}+V_{th1}+V_1$, while the source voltage of the p-type transistor T1 is $V_1$.

Since the p-type driving transistor T1 operates in a saturated region, at this time, the differential voltage between the gate and the source of the p-type driving transistor T1 is expressed as follows:

$$V_{GS}=V_{DATA}+V_{th1}+V_1-V_1=V_{DATA}+V_{th1},$$

According to the following expression of the current of a transistor operating in the saturated region in the prior art:

$$i_D = \frac{K}{2}(V_{GS} - V_{th})^2$$

Then the drain current of the p-type driving transistor T1 may be calculated as follows:

$$i_D = \frac{K}{2}(V_{DATA} + V_{th1} - V_{th1})^2 = \frac{K}{2}(V_{DATA})^2$$

Wherein, K is the current coefficient of the p-type driving transistor;

$$K = C_{ox} \cdot \mu \cdot \frac{W}{L};$$

wherein, $\mu$, $C_{OX}$, W, L are field effect mobility ratio of the transistor, the capacitance per unit area of the gate insulation layer, the channel width, the channel length, respectively; the value of the K in the same structure is held relatively stable;

$i_D$ is the drain current of the transistor;

$V_{GS}$ is the differential voltage between the gate and the source of the transistor; and $V_{th}$ is the threshold voltage of the transistor.

Since the $V_1$ portion of the gate voltage of the p-type driving transistor T1 is offset by the source voltage $V_1$ thereof, and the $V_{th1}$ portion of the gate voltage of the p-type driving transistor T1 is offset by the threshold voltage $V_{th1}$ thereof, the drain current of the p-type driving transistor T1 is independent of the threshold voltage $V_{th1}$ and the voltage V1 output from the power source signal line VDD.

Since the current passing through AMOLED is independent of the signal output from VDD, the variations of the signals output from VDD will not impact on the display of the AMOLED. In this way, the combination of power source signal lines (VDD signal line) of arranged in diverse rows or diverse columns may be used to constitute VDD signal line units of diverse rows and diverse columns. VDD signals from these VDD signal line units may be combined into a single VDD signal in the display stage so as to maintain normal display; in touch-sense stage, VDD signals from these VDD signal line units may separately provide touch signals used for Dx and Ry, respectively, so as to realize the positioning of touch point.

Based on the above-mentioned principle, in the method for driving an AMOLED-based touch display panel according to the embodiment of the present invention, when driving the AMOLED to display, one cycle of driving sequence is divided into two following stages: display stage and touch-sense stage, wherein, in the display stage, a direct-current signal is applied to all of the power source signal lines (VDD signal lines); and in the touch-sense stage, all of the power source signal lines are classified (logically, without changing the arrangement thereof) into two groups: a first group of power source signal lines and a second group of power source signal lines, and the first group of power source signal lines and the second group of power source signal lines are disposed on the AMOLED-based panel at an interval. In an exemplary embodiment, the first group of power source signal lines and the second group of power source signal lines may be two groups of power source signal lines perpendicular to each other, so as to facilitate the determination of the coordinate of the touch point. During the period of touch-sense, a pulse signal (Dx) is applied to the first group of power source signal lines, and the position of touch point is determined by detecting the variation of a signal (Ry) on the second group of power source signal lines. That's to say, the first group of power source signal lines correspond to driving signal electrodes (driving electrodes), and the second group of power source signal lines correspond to receiving signal electrodes (sensing electrodes).

In an exemplary embodiment, the method for dividing one cycle of driving sequence into two stages comprises following first and second methods:

In the first method,
one cycle of driving sequence may be set as one frame, which is divided into two stages, i.e. the above-mentioned display stage and touch-sense stage. In order to not impact on the display effect and keep the continuity of the display, the duration of the display stage is set longer than that of the touch-sense stage.

In the second method,
one cycle of driving sequence may comprise N frames, and a N-th frame is divided into two stages: a first time period and a second time period, the preceding (N−1) frames and the first time period of the N-th frame are defined as the above-mentioned display stages, and the second time period of the N-th frame are defined as the above-mentioned touch-sense stage, wherein, N is an integer not less than 2. Furthermore, the duration of the first time period is set longer than the duration of the second time period.

Generally, in the second method, the continuity of the display is much better.

In a further exemplary embodiment, the first group of power source signal lines and the second group of power source signal lines of two adjacent groups have the same number of signal lines. In this way, the driving electrodes and the sensing electrodes (driving signal electrodes and receiving signal electrodes) may be distributed uniformly, so that the positioning of the touch point may be performed more precisely.

In the method for driving an AMOLED-based touch display panel according to the embodiment of the present invention, the touch technology is accomplished by a pixel structure having the VDD IR drop compensation function, the person skilled in the art may readily understand that the pixel structure adapted to the method for driving an AMO-LED-based touch display panel according to the embodiment of the present invention is not limited to the illustrated pixel structure, and according to the concept of the present invention, such in cell touch technology may be worked out by any pixel structure having the above-mentioned function.

In the method according to the embodiment of the present invention, driving sequence is divided into the display stage and the touch-sense stage, wherein, in the touch-sense stage, the touch sensing and the positioning of the touch point is accomplished by the VDD signal lines, such that no any change is made to any process or profile of the pixel structure so as to reduce the thickness and manufacturing cost of the display device.

Hereinafter, integration operations of the pixel structure having VDD IR drop compensation function used in the embodiment of the present invention with the in cell touch technology, and the principle thereof will be described in detail.

FIG. 1 is a schematic view of the plane structure of a touch panel adapted to the method for driving an AMOLED-based touch display panel according to the embodiment of the present invention. As can be seen from FIG. 1, the touch panel is divided into touch units Dx for transmitting driving signals, and touch units Ry for receiving the driving signals and sensing the variation of the driving signals. Each unit in the touch units Dx and the touch units Ry may comprise one or more pixel units (the pixel unit as shown in FIG. 2) according to different situations. Wire jumpers are needed to connect different touch units, for example, as shown in FIG. 1, the horizontal touch units Dx are spaced by vertical touch units Dy, respectively. In this way, the connection between the horizontal touch units Dx may be accomplished by a traditional active layer doped with metal and/or an ion used as a wire jumper.

Figure 2A:
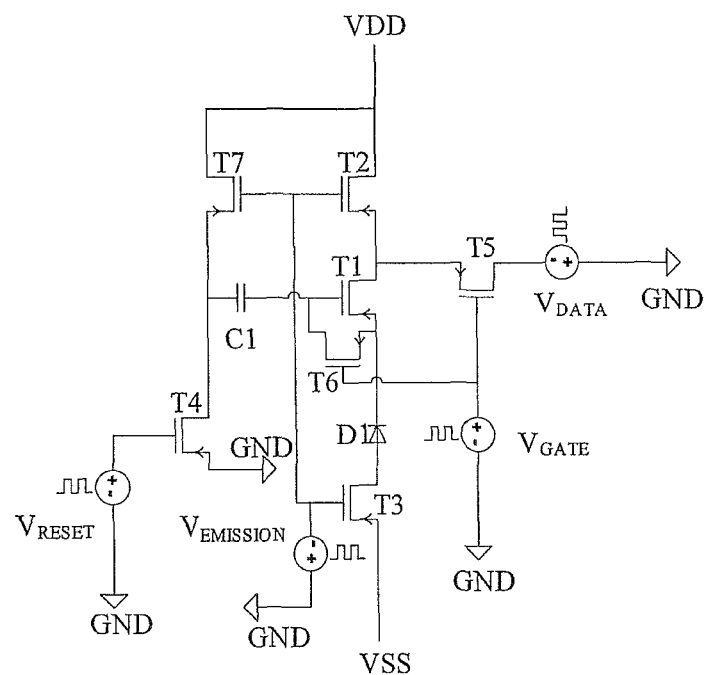
FIG. 2a is an equivalent circuit diagram of the AMOLED pixel structure having VDD IP DROP compensation functions and adapted to a method for driving an AMOLED-based touch display panel according to the embodiment of the present invention.
Figure 2B:
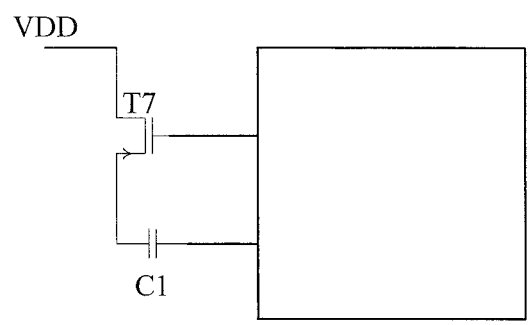
FIG. 2b is a simplified schematic circuit diagram of the pixel structures of FIG. 2a classified based on the touch functions.
Figure 3:
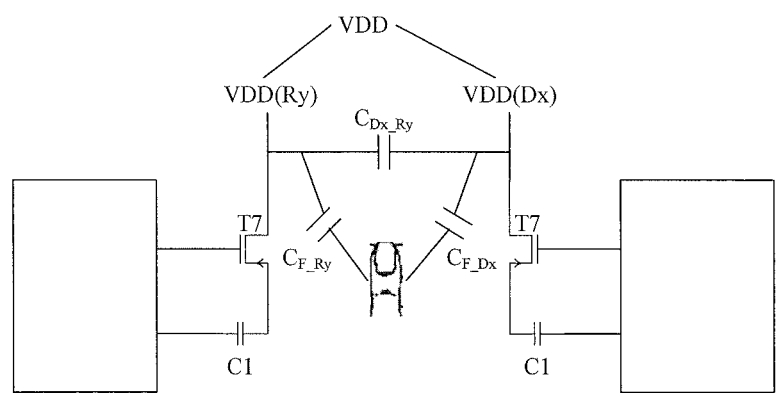
FIG. 3 is a touch-sense principle view of the method for driving an AMOLED-based touch display panel according to the embodiment of the present invention.

FIG. 2b is a schematic circuit diagram of the pixel structures of FIG. 2a classified based on the touch functions, the pixel structure may be divided into two portions, wherein, the left portion comprises VDD signal line (power source signal line), T7 (thin film transistor) and C1 (storage capacitor), and the right portion comprises the rest components and circuits, and the right portion as a whole is illustrated by a square box to simplify the drawing. In FIG. 2a, it can be seen that the VDD signal line has different functions at different stages. In the display stage, the VDD signal line is used as a direct current source so as to supply voltage signal to pixel circuit and drive OLED to emit light. On the other hand, in the touch-sense stage, VDD signal lines are divided into two portions, wherein one portion is used as a driving signal terminal $VDD_{Dx}$ of the touch signal, and another portion is used as a signal receiving terminal $VDD_{Ry}$ of the touch signal for sensing the resultant signal from the driving signal terminal $VDD_{Dx}$. The signal of the driving signal terminal $VDD_{Dx}$ is changed into an impulse signal during the touch-sense stage. This impulse signal is transmitted to the signal receiving terminal $VDD_{Ry}$ through the coupling capacitor $C_{Dx\text{-}Ry}$ (mutual coupling capacitor) between the driving signal terminal $VDD_{Dx}$ and the signal receiving terminal $VDD_{Ry}$, as shown in FIG. 3, so as to produce an impulse signal on the receiving signal terminal $VDD_{Ry}$, which is in correspondence to the impulse signal of driving signal terminal $VDD_{Dx}$ and has a predetermined amplitude. If an external object, such as a finger, touches the AMOLED-based display panel, touch coupling capacitors $C_{f\_Dx}$ and $C_{f\_Ry}$ coupled with the driving signal terminal $VDD_{Dx}$ and the signal receiving terminal $VDD_{Ry}$, respectively, will be produced as shown in FIG. 3. Due to the touch coupling capacitors $C_{f\_Dx}$ and $C_{f\_Ry}$, the charging and discharging on the coupling capacitor $C_{Dx\text{-}Ry}$ between the driving signal terminal $VDD_{Dx}$ and the signal receiving terminal $VDD_{Ry}$ will be redistributed, which brings about variation of the voltage of the signal receiving terminal $VDD_{Ry}$. Through the lines for $VDD_{Ry}$, this variation will be feed back to touch IC, by the logical algorithm of which the touch position of the finger will be determined so as to realize the touch detection function.

FIG. 3 is the principle view of mutual-capacitance for realizing the touch-sense. However, the touch-sense may also be accomplished by self-capacitance, that's to say, each VDD signal line is used as the driving electrode as well as the sensing electrode by merely a respective self-capacitance touch IC.

FIG. 4 is time sequence chart of the method for driving an AMOLED-based touch display panel according to the embodiment of the present invention. As can be seen from the illustrated embodiment, each frame of signal of AMOLED is divided into two stages: one stage is the display stage, in which the power source signal VDD is set as a direct current signal and each row of this frame has the same VDD signal; and during the final period of each frame, or the final period of the last frame of a plurality of frames for display, a touch signal may be transmitted, i.e. the process enters into the touch-sense stage. In touch-sense stage, the VDD signal is changed into an impulse signal without varying other signals, and a square wave impulse signal is employed in this embodiment, but other types of signals may also be employed. In touch-sense stage, the impulse signal is transmitted to different touch units Dx through the $VDD_{Dx}$ signal lines simultaneously, however, the VDD signal for the touch units Ry used as receiving units in each column maintains the same as the display stage, or employs other direct-current signal. The connections between touch signal lines for touch units Dx/Ry in each row and each column may be accomplished inside the each pixel unit, or accomplished in a wiring area outside of the display area, and the same signal lines for respective pixel units are connected together.

Since in the touch-sense stage, EMISSION signal is always kept in the low voltage ON state (because the TFT in this embodiment has a P type structure), the thin film transistor T7 is always in the ON state so as to always connect the power source signal line VDD with the storage capacitor. Since the area of the power source signal line connected with the storage capacitor is relatively large, the power source signal line is adaptable to be used as an electrode end of a touch capacitor so as to improve the accuracy of the touch-sense.

In the present invention, the original time sequence is divided into display stage and touch-sense stage, and no additional touch-sense electrode is added. For the method for positioning the touch point in the touch-sense stage is well-known in the prior art and similar to that of the prior art, so it will not be described in detail again.

The described embodiments are merely used to illustrate the present invention and are not intended to limit the scope of the present invention. The person skilled in the art may make various changes or modifications to these embodiments without departing from the principles and spirit of the disclosure, thus, all of the equivalent technical solutions also fall within the scope of the present invention, the protection scope of the present invention is defined by the following claims.

What is claimed is:

1. A method for driving an AMOLED-based touch display panel, comprising:
   when driving the AMOLED-based touch display panel to display, dividing one cycle of driving sequence into a display stage and a touch-sense stage;
   in the display stage, applying a direct-current voltage signal to all of power source signal lines as power source voltage of a pixel circuit; and
   in the touch-sense stage, logically classifying all of the power source signal lines into a first group of power source signal lines and a second group of power source signal lines, and the first group of power source signal lines and the second group of power source signal lines being disposed on a substrate of the AMOLED-based touch display panel to be perpendicular to each other; and
   during the touch-sense stage, applying a pulse signal to the first group of power source signal lines, and determining the position of a touch point by detecting a variation of a signal on the second group of power source signal lines,
   wherein, the pixel circuit comprises an AMOLED and a driving transistor configured to generate current for driving the AMOLED to emit light, the current being independent of the variations of the direct-current voltage signal, and
   wherein, the one cycle of driving sequence comprises N frames, an N-th frame thereof is divided into a first time period and a second time period, preceding N−1 frames and the first time period of the N-th frame are defined as the display stages, and the second time period of the N-th frame are defined as the touch-sense stage, wherein, N is an integer not less than 2.

2. The method for driving an AMOLED-based touch display panel according to claim 1, wherein,
   the one cycle of driving sequence comprises one frame divided into the display stage and the touch-sense stage.

3. The method for driving an AMOLED-based touch display panel according to claim 2, wherein,
   the duration of the display stage is set longer than the duration of the touch-sense stage.

4. The method for driving an AMOLED-based touch display panel according to claim 1, wherein,
   the duration of the first time period is set longer than the duration of the second time period.

* * * * *